United States Patent [19]

Azuma et al.

[11] Patent Number: 4,819,512
[45] Date of Patent: Apr. 11, 1989

[54] DIFFERENTIAL GEAR FOR A TWO WHEEL OR FOUR WHEEL DRIVE VEHICLE

[75] Inventors: Hitoshi Azuma, Toyota; Hitoshi Mizutani, Aichi, both of Japan

[73] Assignee: Toyota Jidosha Kabushiki Kaisha, Toyota, Japan

[21] Appl. No.: 53,682

[22] Filed: May 26, 1987

[30] Foreign Application Priority Data

| May 26, 1986 | [JP] | Japan | 61-119060 |
| Jun. 10, 1986 | [JP] | Japan | 61-132718 |
| Jun. 17, 1986 | [JP] | Japan | 61-139169 |
| Jun. 24, 1986 | [JP] | Japan | 61-146128 |
| Jun. 24, 1986 | [JP] | Japan | 61-146129 |

[51] Int. Cl.$^4$ .............................................. F16H 1/40
[52] U.S. Cl. ........................................ 74/713; 74/711; 180/248
[58] Field of Search ............... 74/713, 710, 665.6 B, 74/710.5, 711, 695, 724; 180/248, 249

[56] References Cited

U.S. PATENT DOCUMENTS

| 1,246,155 | 11/1917 | Pillmore | 74/713 |
| 1,519,494 | 12/1924 | Kent | 74/713 X |
| 1,802,545 | 4/1931 | Acker | 74/713 |
| 1,946,093 | 2/1934 | Morgan | 74/713 |
| 2,043,006 | 6/1936 | Morgan | 74/713 |
| 2,422,343 | 6/1947 | Duer | 74/724 |
| 2,780,299 | 2/1957 | Matson | 74/713 X |
| 3,288,232 | 11/1966 | Shepherd | 74/711 X |
| 3,874,251 | 4/1975 | Lapitsky et al. | 74/710 X |
| 4,520,690 | 6/1985 | Dangel | 180/249 X |
| 4,552,241 | 11/1985 | Suzuki | 180/249 |
| 4,669,569 | 6/1987 | Suzuki et al. | 180/249 |
| 4,671,135 | 6/1987 | Dangel | 74/710.5 X |

*Primary Examiner*—Leslie A. Braun
*Assistant Examiner*—David Novais
*Attorney, Agent, or Firm*—Oblon, Fisher, Spivak, McClelland & Maier

[57] ABSTRACT

A differential gear includes two rotatable cases, pinions disposed rotatably in each of the cases, first and second side gears meshing with the pinions and disposed rotatably in each of the cases, a first shaft supported rotatably about a co-axis of the cases and extending from the second side gear in the first case to the first side gear in the second case, a second shaft supported rotatably about the co-axis and extending from the first side gear in the first case, a third shaft supported rotatably about the co-axis and extending from the second side gear in the second case, a driven gear provided in the first shaft and a first drive gear for rotating the driven gear to give driving force to the shafts. First and second worm wheels respectively fixed to the first and second cases, first and second worms respectively meshing with the first and second worm wheels and at least one electric motor for rotating the first and second worms are provided. The motor is controlled by a control device so as to maintain the difference between the number of revolutions of the second and third shafts within a predetermined range.

10 Claims, 8 Drawing Sheets

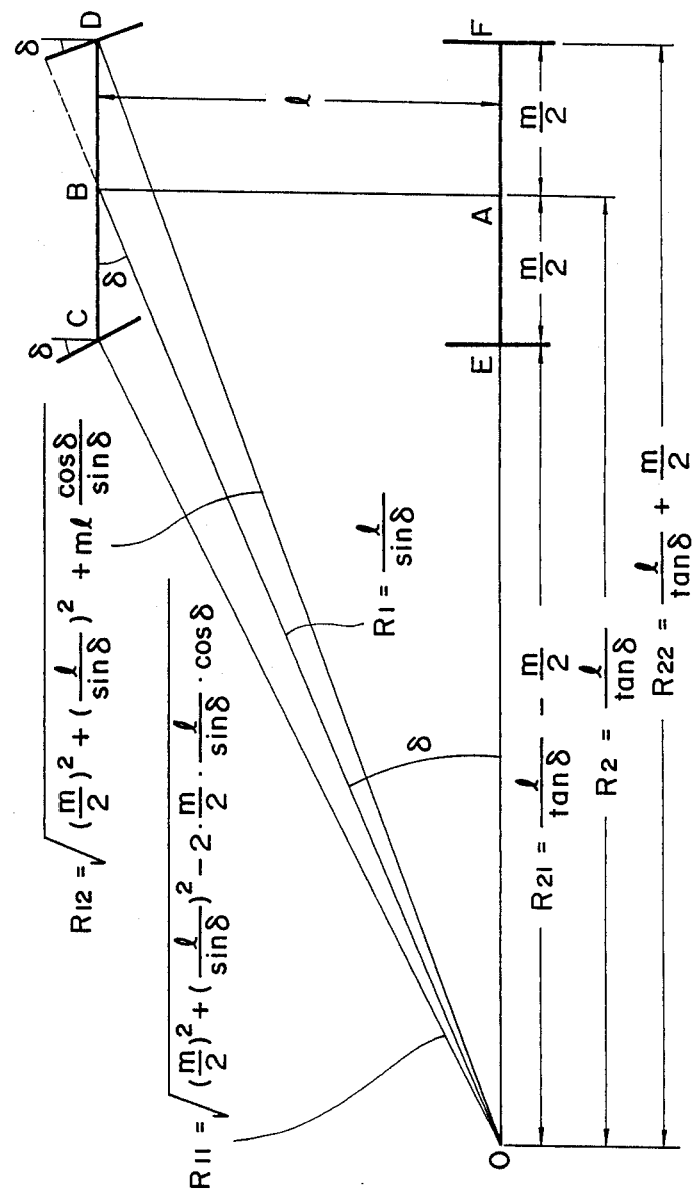

DIFFERENTIAL GEAR FOR A TWO WHEEL OR FOUR WHEEL DRIVE VEHICLE

BACKGROUND OF THE INVENTION

1. Field of the Invention:

This invention relates to a differential gear and, more particularly, to a differential gear used in a drive line of a vehicle to drive front or rear wheels and a center differential gear of a four wheel drive car.

2. Description of the Prior Art:

When one of two wheels connected to a drive line having a differential gear runs on a snow-covered road surface or the like having a low coefficient of friction and such wheel then slips, a phenomena occurs such that the driving force to other wheel connected to the drive line is reduced or utterly lost because of the inherent property of said differential gear.

A similar problem applies to a center differential gear installed to absorb a differential number of revolutions between front and rear wheels on a full time four wheel drive car in turning. Thus, there is proposed a special differential gear with a differential lock or a limited slip differential.

Since the special differential gear needs the differential lock or limited slip differential, the construction of the special differential gear is complicated.

When the special differential gear is provided with the differential lock, a driver has complexities that he or she has to lock and unlock the differential lock, and moreover there is a possibility of dangerous wrong operation to lock it in turning.

When the limited slip differential is incorporated in the special differential gear, the driving force transmitting capacity is structurally limited. In this case, a sufficient driving force cannot be transmitted.

SUMMARY OF THE INVENTION

An object of the present invention is to provide a differential gear in which one of a plurality of wheels connected to a drive line having the differential gear never slips.

Another object of the present invention is to provide a differential gear which dispenses with a differential lock or a limited slip differential.

A further object of the present invention is to provide a differential gear which dispenses with any operation by a driver.

A differential gear according to the present invention comprises first and second cases supported rotatably about a co-axis and spaced axially from each other, pinions disposed rotatably in each of the cases, first and second side gears meshing with the pinions and disposed rotatably in each of said cases, a first shaft supported rotatably about the co-axis of said cases and extending from the second side gear in the first case to the first side gear in the second case, a second shaft supported rotatably about said co-axis and extending from the first side gear in the first case, a third shaft supported rotatably about said co-axis and extending from the second side gear in the second case in the opposite direction to said second shaft, driven means provided in one of said first, second and third shafts, first means for rotating said driven means to give driving force to said first, second and third shafts, a first worm wheel provided in the first case, a second worm wheel provided in the second case, second rotary means having a first worm meshing with the first worm wheel, third rotary means having a second worm meshing with the second worm wheel and a control device for controlling the number of revolutions of at least one of said second and third, rotary means to maintain the difference between the number of revolutions of said second shaft and that of said third shaft within a predetermined range.

The control device is a CPU or a computer for calculating on the basis of signals from a steering angle sensor and a vehicle speed sensor to control the number of revolutions of at least one of the second and third rotary means.

Preferably, the driven means is provided in said first shaft and interposed between the cases.

When the differential gear is used for a front differential gear of a front wheel drive car or a rear differential gear of a rear wheel drive car, the second and third shafts are respectively connected to the drive wheels.

Even if any of drive wheels runs onto snow or the like at the time of straight driving of a vehicle, since rotation of each of the cases is ceased to maintain the difference between the number of revolutions of the second shaft and that of the third shaft to zero, there never occurs a differential between the second and third shafts. As a result, the drive wheel on snow or the like does not slip.

The control drive calculates the difference between the number of revolutions of the drive wheel located on the outside in turning and that of the drive wheel located the inside in turning from a steering angle and vehicle speed at the time of turning of the vehicle and controls at least one of the second and third rotary means to give the difference to both drive wheels. In this case, the rotary means which is one of the second and third rotary means and located more near to the inside wheel is preferably controlled so as to reduce the number of revolutions of the shaft connected to the inside wheel. Thus, loss of control can be eliminated.

When the differential gear is used for a center differential gear of a four wheel drive car, one of said second and third shafts is connected to a propeller shaft at the front side and the other to a propeller shaft at the rear side.

Even if one of four drive wheels runs onto snow or the like at the time of straight driving of the vehicle and the drive wheel as a result tends to rotate at a number of revolutions higher than that corresponding to the vehicle speed, the control device maintains the cases in a non-rotating condition, so that the difference between the numbers of revolutions of the propeller shafts at the front and rear sides becomes zero. Thus, the drive wheel does not slip.

The control device calculates the difference between the numbers of revolutions of the propeller shafts at the front and rear sides from the steering angle and vehicle speed at the time of turning of the vehicle and controls at least one of the second and third rotary means to give the difference to the propeller shafts at both sides.

Since the differential gear is provided with original driven means and first rotary means and further the worm wheels and second and third rotary means each of which has the worm and operates independently of said first rotary means, and the difference between the numbers of revolutions of the second and third shafts is held substantially zero at the time of straight driving and held within a predetermined range at the time of turning, one of a plurality of drive wheels is prevented from slipping. Also, smooth turning can be ensured.

Since the second and third rotary means are operated by the control device, a driver can be relieved from operational steps.

Since the differential lock and limited slip differential are not needed, the construction of the differential gear can be simplified.

BRIEF DESCRIPTION OF THE DRAWINGS

The other objects and features of the invention will become apparent from the following description of preferred embodiments of the invention with reference to the accompanying drawings in which:

FIG. 7 is a view showing turning angle and other dimensions of a vehicle in turning.

DESCRIPTION OF THE PREFERRED EMBODIMENTS

Figure 1:
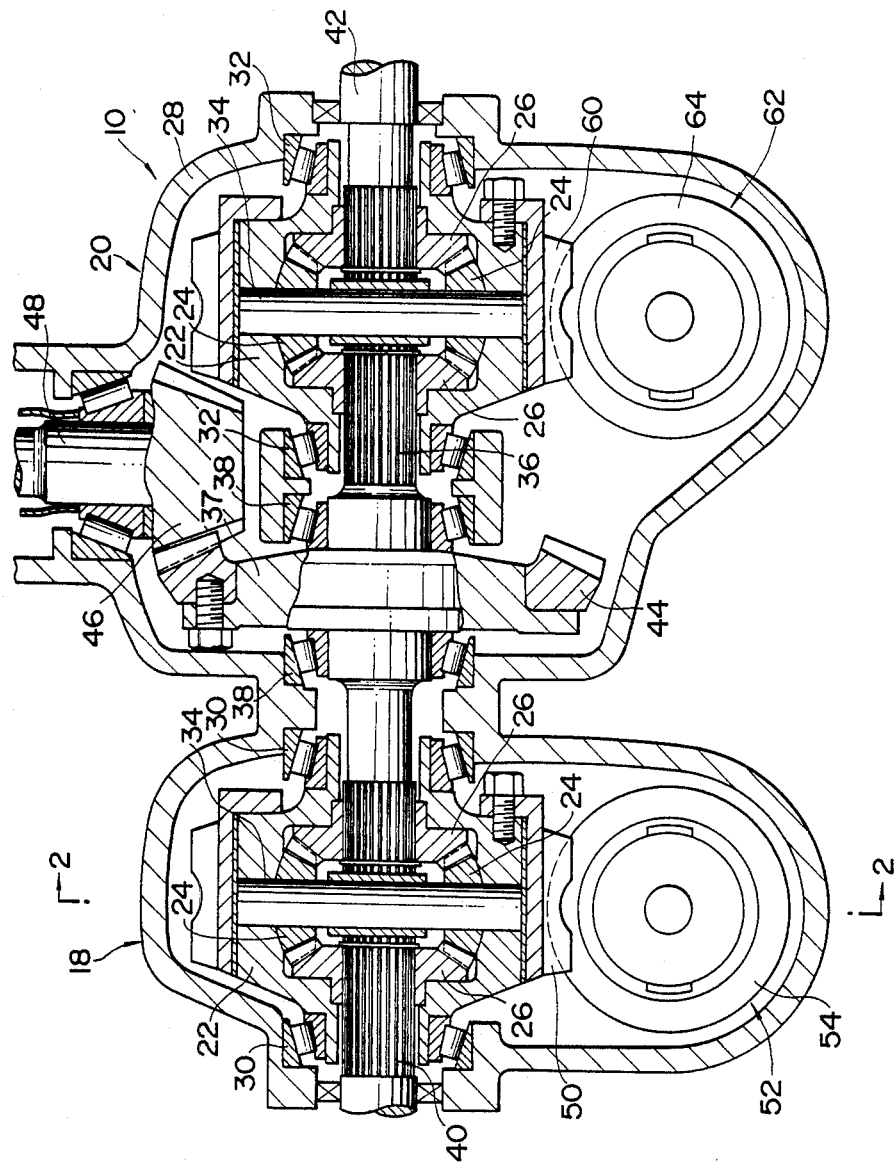
FIG. 1 is a sectional view taken along a coaxis of cases a differential gear.
Figure 2:
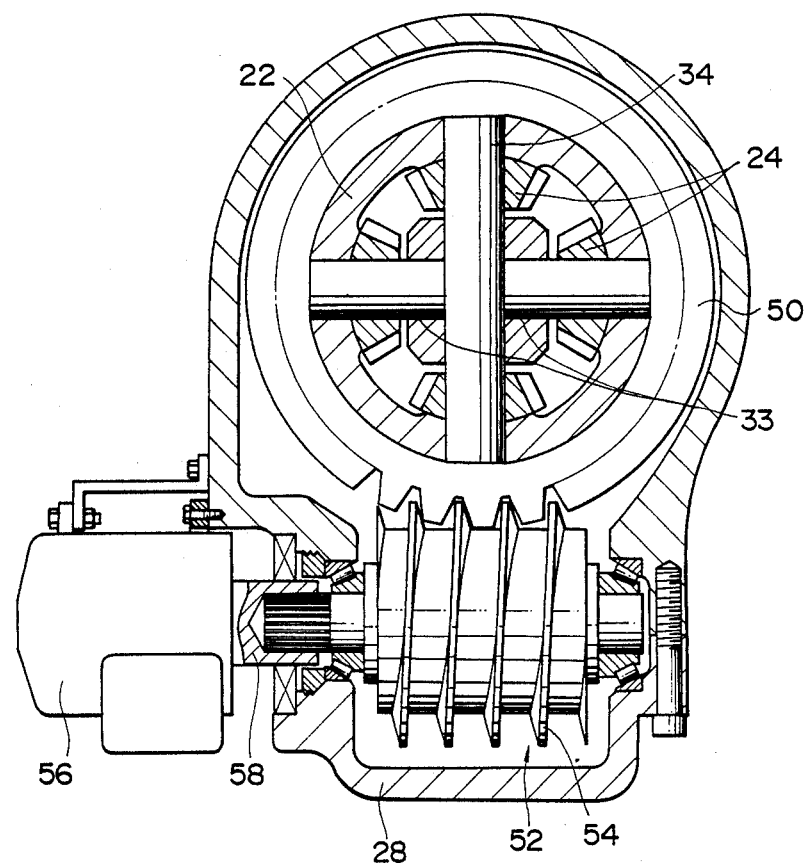
FIG. 2 is a sectional view taken along the line 2—2 in FIG. 1.

A differential gear or a driving force transmitting apparatus 10 shown in FIGS. 1 and 2 has two differential gears 18,20. Each differential gear comprises a case 22, pinion gears 24 and side gears 26 disposed respectively in the case 22.

Each case 22 is a so-called differential case, and two cases 22 are disposed in a differential carrier 28 and spaced axially from each other. The case 22 of the differential gear 18 is supported rotatably by a pair of roller bearings 30, and the case 22 of the differential gear 20 by a pair of roller bearings 32 respectively attached to the differential carrier 28. The cases 22 are rotatable about a co-axis.

At least one pinion shaft is fixed in each case 22. In an embodiment shown in FIG. 2, two short pinion shafts 33 are disposed orthogonally to a long pinion shaft 34. These pinion shafts have their axes arranged orthogonally to the co-axis of the cases 22. By the long pinion shaft 34 and short pinion shafts 33 are rotatably supported a pair of pinions 24 axially spaced from each other. When a single pinion shaft is used, two pinions 24 are rotatably supported by the pinion shaft.

Two side gears 26 are disposed in each case 22 and spaced from each other to mesh with four pinions 24 respectively.

A first shaft 36 is connected through serrations with the right side gear 26 in the case 22 of the differential gear 18, extending to the left side gear 26 in the case 22 of the differential gear 20 and connected through serrations with the left side gear 26. The shaft 36 is supported by a pair of roller bearings 38 attached to the differential carrier 28 and is rotatable about the co-axis of the cases 22. A boss 37 is formed integrally with the shaft 36.

A second shaft 40 is connected through serrations with the left side gear 26 in the case 22 of the differential gear 18 and extends from the case 22 in an opposite direction to the first shaft 36. The shaft 40 projects from the differential carrier 28. The shaft 40 is supported by roller bearings (not shown) and is rotatable about the co-axis of the case 22.

A third shaft 42 is connected through serrations with the right side gear 26 in the case 22 of the differential gear 20 and extends from the case 22 in the opposite direction to the second shaft 40. The shaft 42 projects from the differential carrier 28. The shaft 42 is supported by roller bearings (not shown) and is rotatable about the co-axis of the case 22.

A driven means is provided in one of the first, second and third shafts. In the embodiment shown in FIG. 1, the driven means is a bevel gear 44 and is connected to the boss 37 of the first shaft 36 through bolts. The bevel gear 44 meshes with a bevel gear 46 of a first rotary means fixed to a shaft 48 and transmits a driving force transmitted from the shaft 48 to the first, second and third shafts 36,40 and 42.

A worm wheel 50 is fixed to the case 22 of the differential gear 18 through a plurality of bolts.

A second rotary means 52 for rotating the worm wheel 50 comprises a worm 54 which is rotatably supported by the differential carrier 28. On the other hand, an electric motor 56 is mounted on the differential carrier 28 and a shaft of the worm 54 is connected through serrations with an output shaft 58 of the motor 56.

A worm wheel 60 is fixed to the case 22 of the differential gear 20 through a bolts.

A third rotary means 62 for rotating the worm wheel 60 comprises a worm 64. The constitution of the third rotary means is similar to that of the second rotary means 52, so any detailed drawing of the same is instead abbreviated.

As will be later described, when signals from a steering angle sensor and a vehicle speed sensor are to a control device, the control device calculates the numbers of revolutions and directions of rotations of the second and third rotary means 52,62 on the basis of these signals and controls at least one of them to maintain the difference between the numbers of revolutions of the second and third shafts 40,42 within a predetermined range including zero.

Said differential gear 10 is used in various forms.

Figure 3:
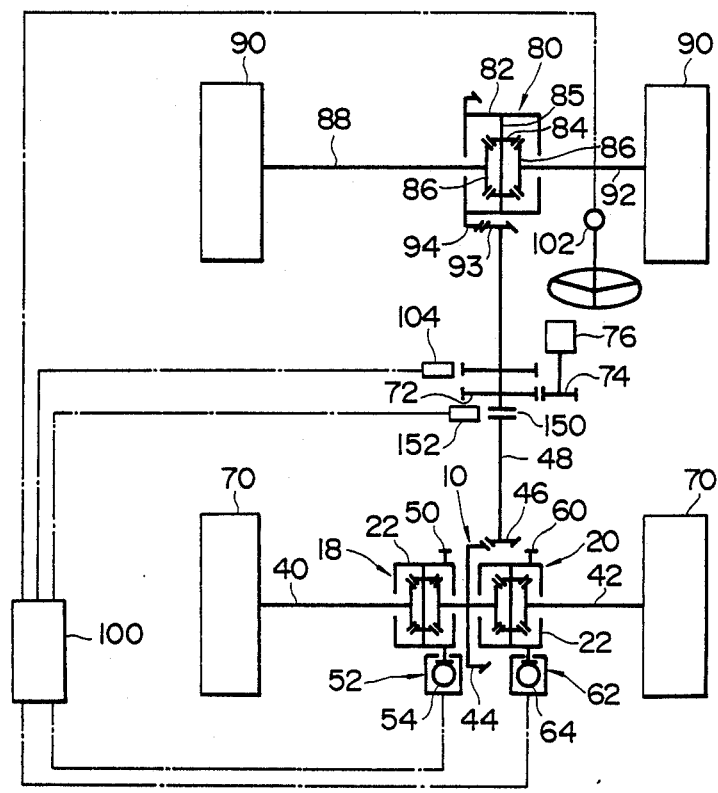
FIGS. 3 to 6 are schematic views showing the specific application of the differential gear.

Referring to FIG. 3 showing schematically the embodiment, in which the differential gear 10 is used for a rear differential gear in a four wheel drive car, the differential carrier 28 is fixed to a car body between rear wheels 70 and the shaft 48 is a propeller shaft. A spur gear 72 fixed to the propeller shaft 48 meshes with a spur gear 74 connected to a transmission 76.

The second shaft 40 is connected through a universal joint (not shown) to the left rear wheel 70, and the third shaft 42 to the right rear wheel 70. Since the bevel gear 46 fixed at a rear end of the propeller shaft 48 meshes with the bevel gear 44, the driving force from the propeller shaft 48 is transmitted through the differential gear 18 to the second shaft 40 on the one hand and through the differential gear 20 to the third shaft 42 on the other hand.

A front differential gear 80 is connected to an end of the propeller shaft 48. The differential gear 80 has the constitution known per se, that is, includes a rotatable case 82, pinions 84 rotatably supported by a pinion shaft 85 in the case 82 and a pair of side gears 86 disposed rotatably in the case 82 and meshing with the pinions 84. A drive shaft 88 extends from one of the side gears 86 to a left front wheel 90, and a drive shaft 92 from the other of the side gears 86 to a right front wheel 90. The driving force from the propeller shaft 48 is transmitted to the drive shafts 88,92 through a bevel gear 93 fixed to the propeller shaft 48 and a bevel gear 94 fixed to the case 82 and meshing with the bevel gear 93.

As is apparent from the drawing, there is no center differential gear in the four wheel drive car shown in FIG. 3.

A control device 100 is a computer or a CPU which receives signals from a steering angle sensor 102 and a vehicle speed sensor 104 well known per se. The steering angle sensor 102 detects the size of angle and steering direction. The control device 100 calculates on the basis of signals the difference of numbers of revolutions of the shafts 40,42. The device 100 further calculates the difference in the number of revolutions which will occur between a front propeller shaft and a rear propeller shaft, if there is provided as a prior art a center differential gear between the front and rear propeller shafts. The worm 54 of the second rotary means 52 and the worm 64 of the third rotary means 62 are respectively rotated by the motors according to the calculation.

Instead of the embodiment shown in FIG. 3, the reverse arrangement is possible, that is, the differential gear 10 may be disposed in front and engaged with the front wheels 90 and the differential gear 80 in rear to engage with the rear wheels 70.

Figure 4:
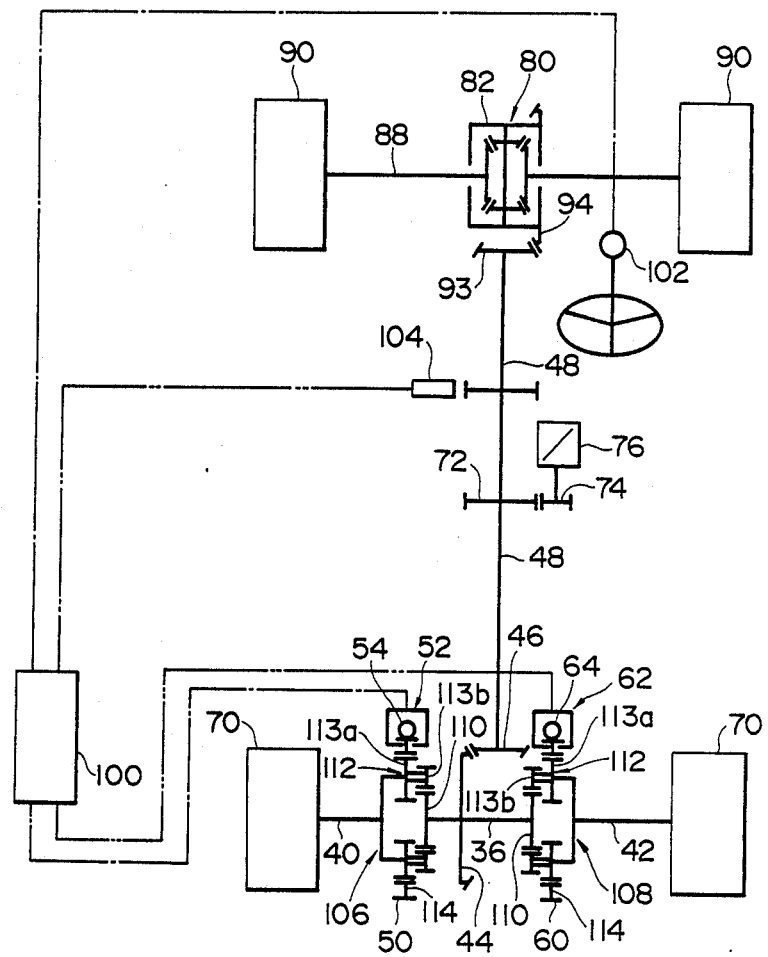

In FIG. 4 showing schematically the embodiment, in which the front differential gear 80 is substantially the same constitution as shown in FIG. 3 except that the bevel gear 94 meshing with the bevel gear 93 is disposed at the right side of the case 82, a rear differential gear is constituted by a pair of planetary gear devices 106,108. In the drawing, parts having same functions as those in FIGS. 1 to 3 are indicated by the same numerals.

The bevel gear 44 meshing with the bevel gear 46 of the propeller shaft 48 is fixed to the first shaft 36, each end of which has a sun gear 110. Each planetary gear 112 includes a large spur gear 113a and a small spur gear 113b formed integrally with the large gear 113a, and the small spur gear 113b meshes with the sun gear 110. The large spur gear 113a meshes with a ring gear 114.

The second shaft 40 is connected at its one end to the large spur gears 113a of the left planetary gear device 106 and the third shaft 42 to the large spur gears 113a of the right planetary gear device 108. The first, second and third shafts are co-axially rotatable.

The worm wheel 50 is fixed on an outer periphery of the ring gear 114 provided in relation to the left planetary gear device 106, while the worm wheel 60 is fixed on an outer periphery of the ring gear 114 in the right planetary gear device 108. The worm wheels 50,60 mesh with the worms 54,64 respectively.

Figure 5:
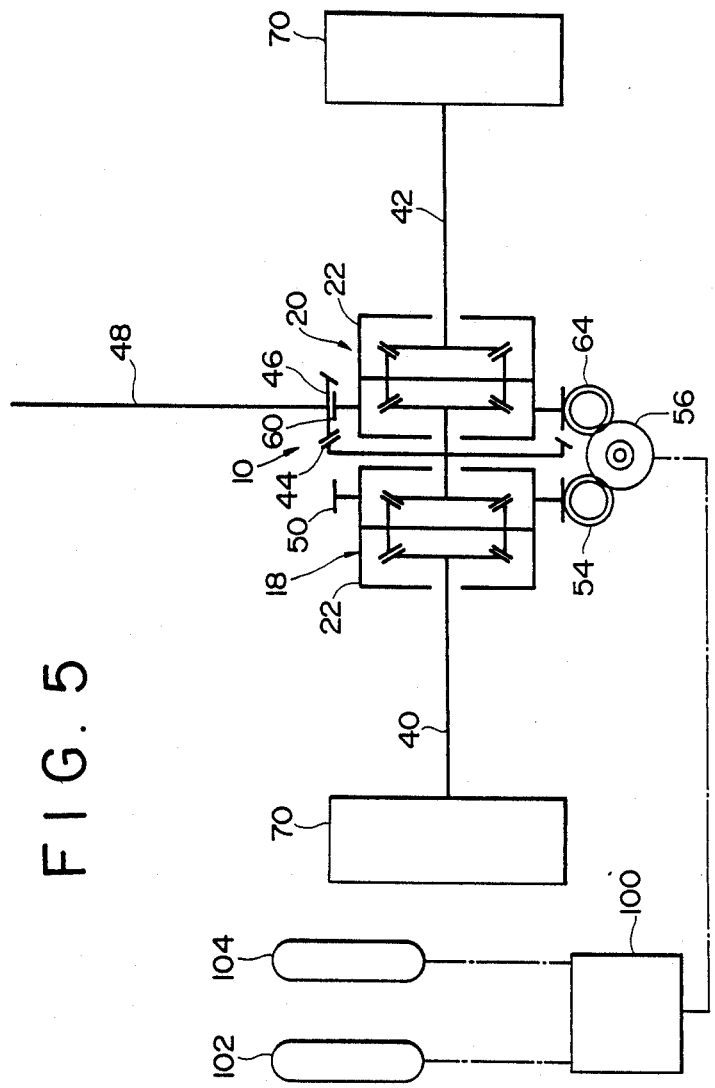

In FIG. 5 showing schematically the embodiment, in which the differential gear 10 is used for a rear differential gear, the differential gear 10 is modified in that the torsional direction of teeth of the worm wheel 50 reverses to that of the worm wheel 60 and the torsional direction of teeth of the worm 54 reverses to that of the worm 64. In this embodiment, only one electric motor 56 is required for controlling the second and third rotary means 52,62.

Figure 6:
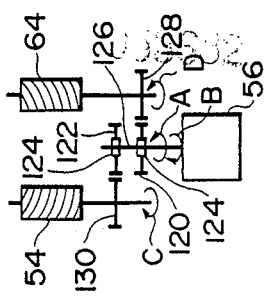

A spur gear 120 and a spur gear 122 are, as shown in FIG. 6, respectively connected through single-direction type clutches 124 known per se to a shaft 126 of the electric motor 56. The spur gear 120 meshes with a spur gear 128 connected to the worm 64 and the spur gear 122 meshes with a spur gear 130 connected to the worm 54. The single-direction type clutch 124 is constituted such that the spur gears 122,130 rotate but spur gears 120,128 never rotate when shaft 126 is rotated in the direction A and vice versa in direction B. Thus, the worm 54 only rotates in direction C and the worm 64 in the direction D.

The calculation in the control device is carried out by properly using the following formulas.

As shown in FIG. 7, it is assumed that the number of revolutions of the front propeller shaft is set as $N_1$, a wheel base of the vehicle as l, a wheel tread as m, a tire turning angle as $\delta$ and the final reduction ratio of the front side differential gear as $i_1$. Among said factors are detected the number of revolution $N_1$ and the tire turning angle $\delta$ respectively from the vehicle speed sensor and steering angle sensor.

Then, the average turning radius $R_1$(OB) of the front wheels, average turning radius $R_2$(OA) of the rear wheels, turning radius $R_{11}$(OC) of a front inner wheel, turning radius $R_{12}$(OD) of a front outer wheel, turning radius $R_{21}$(OE) of a rear inner wheel and turning radius $R_{22}$(OF) of a rear outer wheel are given as shown in FIG. 7.

The number of revolutions $N_2$ of the rear propeller shaft, the difference $\Delta N$ between the numbers of revolutions of the front and rear propeller shafts, the average number of revolutions $n_1$ of the front wheels and the average number of revolutions $n_2$ of the rear wheels are respectively obtained from the following formulas;

$$N_2 = \cos\delta N_1$$

$$\Delta N = N_1 - N_2 = (1 - \cos\delta)N_1$$

$$n_1 = \frac{N_1}{i_1}$$

$$n_2 = \frac{N_1}{i_1} \cos\delta$$

The number of revolutions $n_{21}$ of the rear inner wheel is obtained as follows;

$$n_{21} = \frac{(l - \tan\delta \cdot m/2) \cdot N_1 \cdot \cos\delta}{l \cdot i_1}$$

from the following relationship $$\frac{R_{21}}{n_{21}} = \frac{R_2}{n_2}$$

Similarly, the number of revolutions $n_{22}$ of the rear outer wheel is obtained as follows:

$$n_{22} = \frac{(l + \tan\delta \cdot m/2) \cdot N_1 \cdot \cos\delta}{l \cdot i_1}$$

from the following relationship $$\frac{R_{22}}{n_{22}} = \frac{R_2}{n_2}$$

Thus, the differential number of revolutions $\Delta n_2$ of the rear wheels is obtained as follows;

$$\Delta n_2 = \frac{m \cdot N_1}{l \cdot i_1} \sin\delta$$

On the other hand, the number of revolutions $n_{11}$ of the front inner wheel is obtained as follows;

$$n_{11} = \frac{\sqrt{(\sin^2\delta \cdot m^2/4 + l^2 - m \cdot l \cdot \sin^2\delta/\cos\delta)}}{l \cdot i_1} \cdot N_1$$

from the following relationship $$\frac{R_{11}}{n_{11}} = \frac{R_1}{n_1}$$

Similarly, the number of revolutions $n_{12}$ of the front outer wheel is obtained as follows;

$$n_{12} = \frac{\sqrt{(\sin^2\delta \cdot m^2/4 + l^2 + m \cdot l \cdot \sin^2\delta/\cos\delta)}}{l \cdot i_1} \cdot N_1$$

from the following relationship $$\frac{R_{12}}{n_{12}} = \frac{R_1}{n_1}$$

Accordingly, the differential number of revolution $\Delta n_1$ of the front wheels is obtained as follows;

$$\Delta n_1 = (n_{12} - n_{11})$$

(Operation of Embodiment)

Figure 8:
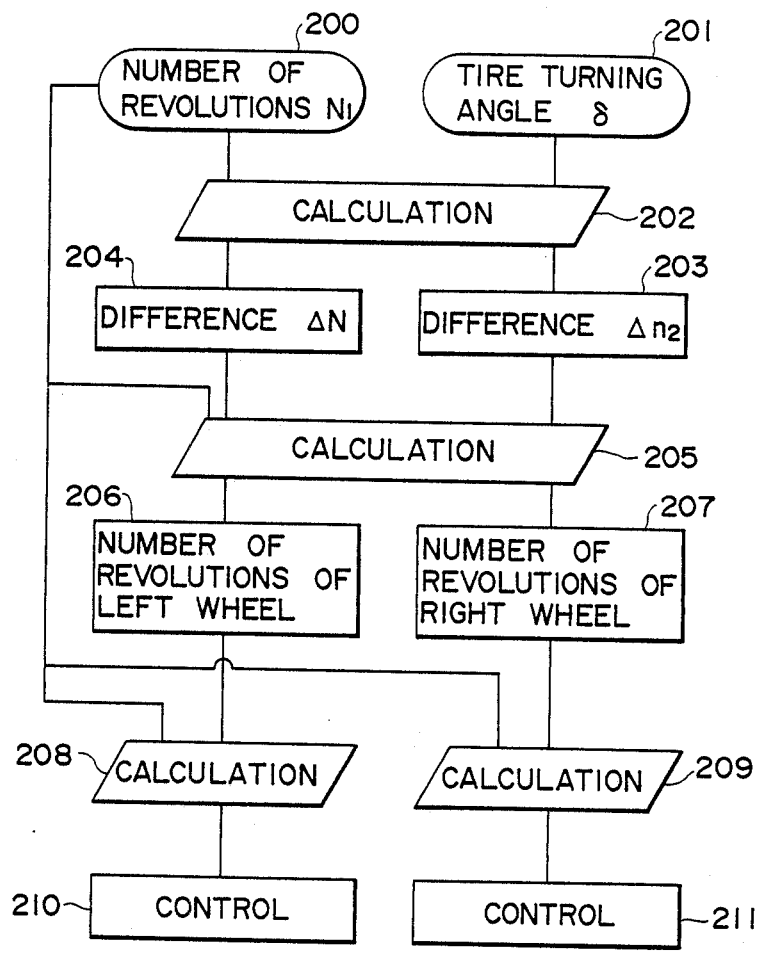
FIGS. 8 and 9 are flow charts showing the operation of control.

As shown in FIG. 3, when the differential gear 10 is used for a rear differential gear, the control device 100 performs a controlling operation as shown in FIG. 8.

The number of revolutions $N_1$ is detected (200) from the vehicle speed sensor 104 and the tire turning angle $\delta$ is detected (201) from the steering angle sensor 102. Then, the calculation is carried out (202). The difference $\Delta n_2$ (203) between the numbers of revolutions of the rear wheels and the difference $\Delta N$ (204) between the numbers of revolutions of the front and rear propeller shafts which will occur theoretically if a center differential gear is installed in the propeller shaft 48 are obtained respectively.

Calculation to absorb the differences $\Delta n_2$, $\Delta N$ by means of the numbers of revolutions of the rear wheels is carried out (205) considering the reduction ratio of the bevel gears 46,44. Then, the number of revolutions to be given to the left wheel (206) and that to be given to the right wheel (207) are respectively obtained.

Calculation for obtaining the control value by means of the number of revolutions of the left rear wheel and the vehicle speed is carried out (208) and the electric motor 56 of the second rotary means 52 is controlled (210). The same calculation is carried out (209) for the right rear wheel and the electric motor 56 of the third rotary means 62 is controlled (211).

In running of the vehicle, the worm wheels 50,60 can be rotated by the worms 54,64 respectively. However, the reverse operation, i.e., the rotation of each of the worms by each of the worm wheel is impossible according to the property of the worm. Thus, the differential gear 10 is securely controlled by the number of revolutions and directions of rotations of at least one electric motor 56.

Figure 9:
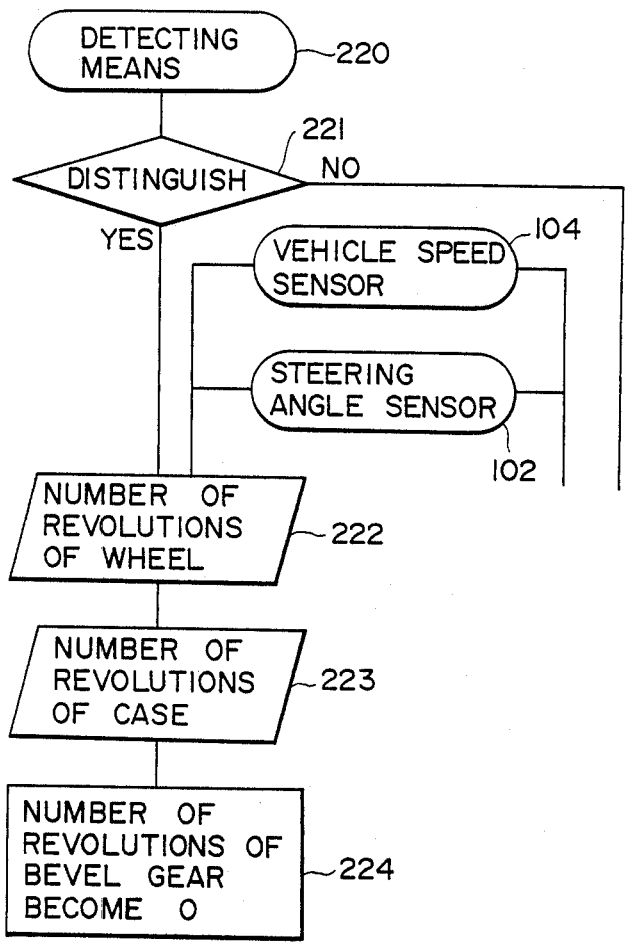

In the embodiment shown in FIG. 3, a part time four wheel drive vehicle can be obtained by installing a transfer driving force transfer device 150 in relation to the propeller shaft 48, the transfer device 150 known per se being capable of distributing driving force to the front and in the rear. In this case, the control device 100 controls as shown in FIG. 9.

When signals from a detecting means 152 are inputted (220), the control device 100 distinguishes between two wheel drive and four wheel drive (221). In case of two wheel drive, the numbers of revolutions of the rear wheels are calculated (222) on the basis of signals from the vehicle speed sensor 104 and the steering angle sensor 102. Now, there is a relation among the numbers of revolutions of the case and shafts specified by the formula;

$$M_0 = \tfrac{1}{2}(M_1 + M_2)$$

where $M_0$ is the number of revolutions of the case, $M_1$ is the number of revolutions of one of the shafts extending from the case and $M_2$ is the number of revolutions of the other.

The control device 100 calculates (223) the number of revolutions of the case which is equal to $M_1/2$ and controls the second and third rotary means 52,62 to rotate each of the case at the calculated value. As a result, the number of revolutions of the bevel gear 44 becomes zero (224), thereby preventing the accompanying rotation of a portion of the propeller shaft 48 located Obviously, numerous modifications and variations of the present invention are possible in light of the above teachings. It is therefore to be understood that within the scope of the apended claims, the invention may be practiced otherwise than as specifically described herein.

What is claimed is:

1. A differential gear comprising:
   first and second cases supported rotatably about a co-axis and spaced axially from each other;
   pinions disposed rotatably in each of said cases;
   first and second side gears meshing with the pinions and disposed rotatably in each of said cases;
   a first shaft supported rotatably about the co-axis of said cases and extending from the second side gear in the first case to the first side gear in the second case;
   a second shaft supported rotatably about the co-axis and extending from the first side gear in the first case;
   a third shaft supported rotatably about the co-axis and extending from the second side gear in the second case in the opposite direction to said second shaft;
   driven means provided in one of said first, second and third shafts;
   first rotary means for rotating said driven means to transmit driving force to said first, second and third shafts;
   a first worm wheel provided in the first case;
   a second worm wheel provided in the second case;
   second rotary means having a first worm meshing with the first worm wheel;
   third rotary means having a second worm meshing with the second worm wheel; and a control device for calculating, on the basis of signals from a steering angle sensor and a vehicle speed sensor, the number of revolutions of at least one of said second and third rotary means.

2. A differential gear as claimed in claim 1, wherein said control device controls at least one of said second and third rotary means for maintaining the difference between the number of revolutions of said second and third shafts within a predetermined range.

3. A differential gear as claimed in claim 1, wherein said differential gear is installed in one of front and rear drive lines and said second and third shafts are connected respectively to left and right drive wheels, and wherein said control device controls one of the second and third rotary means which is located more near an inside wheel in turning of a vehicle so as to reduce the number of revolutions of that shaft connected to the inside wheel.

4. A differential gear comprising:
first and second cases supported rotatably about a co-axis and spaced axially from each other;
pinions disposed rotatably in each of said cases;
first and second side gears meshing with the pinions and disposed rotatably in each of said cases;
a first shaft supported rotatably about the co-axis of said cases and extending from the second side gear in the first case to the first side gear in the second case;
a second shaft supported rotatably about the co-axis and extending from the first side gear in the first case;
a third shaft supported rotatably about the co-axis and extending from the second side gear in the second case in the opposite direction to said second shaft;
driven means provided in one of said first, second and third shafts;
first rotary means for rotating said driven means to transmit driving force to said first, second and third shafts;
a first worm wheel provided in the first case;
a second worm wheel provided in the second case;
second rotary means having a first worm meshing with the first worm wheel and a second worm meshing with the second worm wheel, the second rotary means being actuated by a single actuator; and
a control device for calculating on the basis of signals from a steering angle sensor and a vehicle speed sensor the number of revolutions of said second rotary means.

5. A differential gear as claimed in claim 4, wherein said second rotary means includes two single-direction type clutches and each of said worms is rotated only in one direction.

6. A differential gear comprising:
first and second sun gears supported rotatably about a co-axis and spaced axially from each other;
a plurality of planetary gears meshing with each of said sun gears;
a first shaft supported rotatably about the co-axis of said sun gears and extending from the first sun gear to the second sun gear;
a second shaft supported rotatably about the co-axis and extending from the plurality of planetary gears engaged with said first sun gear;
a third shaft supported rotatably about the co-axis and extending from the plurality of planetary gears engaged with said second sun gear in the opposite direction to said second shaft;
driven means provided in one of said first, second and third shafts;
first rotary means for rotating said driven means to transmit driving force to said first, second and third shafts;
a first worm wheel having an inner gear meshing with the plurality of planetary gears engaged with the first sun gear;
a second worm wheel having an inner gear meshing with the plurality of planetary gears engaged with the second sun gear;
second rotary means having a first worm meshing with the first worm wheel;
third rotary means having a second worm meshing with the second worm wheel; and
a control device for calculating, on the basis of signals from a steering angle sensor and a vehicle speed sensor, the number of revolutions of at least one of said second and third rotary means.

7. A four wheel drive vehicle including a propeller shaft extending longitudinally of the vehicle, a first differential gear coupled with one end of the propeller shaft and a second differential gear coupled with the other end of the propeller shaft, one of the first and second differential gears comprising:
first and second cases supported rotatably about a co-axis and spaced axially from each other;
pinions disposed rotatably in each of said cases;
first: and second side gears meshing with the pinions and disposed rotatably in each cases;
a first shaft supported rotatably about the co-axis of said cases and extending from the second side gear in the first case to the first side gear in the second case;
a second shaft supported rotatably about the co-axis and extending from the first side gear in the first case, the second shaft being connected to one of right and left drive wheels;
a third shaft supported rotatably about the co-axis and extending from the second side gear in the second case in the opposite direction to said second shaft, the third shaft being connected to the other of the drive wheels;
driven means provided in one of said first, second and third shafts;
first rotary means for rotating said driven means to transmit driving force to said first, second and third shafts, the first rotary means being connected to the propeller shaft;
a first worm wheel provided in the first case;
a second worm wheel provided in the second case;
second rotary means having a first worm meshing the first worm wheel;
third rotary means having a second worm meshing with the second worm wheel; and
a control device for calculating, on the basis of signals from a steering angle sensor and a vehicle speed sensor, the number of revolutions of at least one of said second and third rotary means.

8. A four wheel drive vehicle as claimed in claim 7, which further comprises a driving force transfer device for engaging the propeller shaft and which is operable when said vehicle is used as a two wheel drive vehicle.

9. A four wheel drive vehicle as claimed in claim 8, wherein said control device controls said second and third rotary means such that the number of revolutions of the driven means becomes zero when used as a two wheel drive vehicle in straight running.

10. A differential gear comprising:
a first shaft supported rotatably around a rotary axis;
two first gear means fixed respectively to ends of the first shaft;
first and second transmitting means, each including second gear means meshing with the first gear means and supported movably around said rotary axis;
a second shaft supported rotatably around said rotary axis and extending from the first transmitting means;
a shaft supported rotatably around said rotary extending from the second transmitting means in the opposite direction to the second shaft;
a driven means provided in one of said first, second and third shafts;
first rotary means for rotating said driven means to transmit driving force to said first, second and third shafts;
a first worm wheel connected to the first transmitting means;
a second worm wheel connected to the second transmitting means;
second rotary means having a first worm meshing with the first worm wheel;
third rotary means having a second worm meshing with the second worm wheel; and
a control device for calculating on the basis of signals from a steering angle sensor and a vehicle speed sensor the number of revolutions of at least one of said second and third shafts.

* * * * *